United States Patent [19]
MacDonald et al.

[11] 3,821,442
[45] June 28, 1974

[54] EMULSIFIER FOR FROZEN CONFECTIONS

[75] Inventors: Ira A. MacDonald, Prior Lake, Minn.; Richard R. Egan, Worthington, Ohio; Sidney B. Lampson, Hinsdale, Ill.

[73] Assignee: Ashland Oil, Inc., Houston, Tex.

[22] Filed: Nov. 20, 1970

[21] Appl. No.: 91,517

[52] U.S. Cl. .................................. 426/356, 426/362
[51] Int. Cl. .................................................. A23g 5/00
[58] Field of Search .......................... 99/136, 118 R

[56] References Cited
UNITED STATES PATENTS
2,821,480   1/1958   Hilkes ................................. 99/136
3,124,464   3/1964   Knightly ............................... 99/136
3,490,918   1/1970   Egan .................................. 99/118 R

*Primary Examiner*—A. Louis Monacell
*Assistant Examiner*—J. M. Hunter

[57] ABSTRACT

Improving frozen confections as to whippability, texture, dryness and stiffness by using as the emulsifier ethoxylated partial glycerol esters of $C_{10}$–$C_{24}$ fatty acids or mixtures thereof.

6 Claims, No Drawings

EMULSIFIER FOR FROZEN CONFECTIONS

BACKGROUND OF THE INVENTION

1. Field of the Invention

This invention relates to the use of an improved emulsifier for preparing frozen confections.

2. Description of the Prior Art

Commercial frozen confections; e.g., ice cream, ice milk, mellorine, etc., are prepared by freezing a homogenized oil-in-water emulsion further containing non-fat milk solids, sugar and flavoring. The oil phase of such emulsions is either milk fat or an edible hydrogenated vegetable oil. In order to obtain a suitable commercial product, however, stabilizers and emulsifiers are incorporated into the frozen confection mix in adjuvant amounts prior to the freezing operation.

The stabilizer enhances consistency and texture of the final product but more importantly serves to obviate the growth of ice crystals during storage. A variety of substances are effective stabilizers for this purpose, representative of which include the alignates, sodium carboxymethyl cellulose, natural and synthetic gums, gelatin and the like.

The emulsifier, apart from stabilizing the homogenized emulsion to prevent churning in the freezing operation, additionally functions to impart a number of desirable properties to the frozen product and hence the use thereof in the making of commercially prepared frozen confections is essential. An emulsifier is accordingly needed to obtain a product having a smooth fine-grained texture and one which at the same time exhibits stiffness and dryness properties. Still another mark of a suitable emulsifier resides in its ability to impart a requisite degree of whippability to the mix, that is, to quickly produce a predetermined amount of overrun, usually 100 percent, during the course of the freezing operation.

Almost all of the higher fatty acid esters containing free hydroxyl groups, which class broadly includes the partial fatty acid esters of a polyol or the polyethoxylated derivatives thereof, exhibit some degree of emulsification functionality in the present context. There is, however, a virtual dearth of the foregoing type products which when used in an adjuvant quantity, i.e., from about 0.05 to 0.3 percent based on the weight of the frozen mix, will result in a commercially acceptable frozen product. The more effective emulsifiers known in the art to date collectively suffer in the sense that they do not per se provide uniform results in attaining the combination of fair texture, stiffness, dryness and whippability. Thus, it is common practice to use such emulsifiers in blends with other types of emulsifiers in order to achieve the indicated combination of properties.

SUMMARY OF THE INVENTION

In accordance with the present invention, an improved emulsifier is provided for use in preparing commercial frozen confections. Such emulsifiers include broadly the condensation products or adducts obtained by ethoxylating a partial glycerol ester of a $C_{10} - C_{24}$ fatty acid or mixture thereof.

The condensates of this invention have proven to have applicability in attaining an optimum combination of smooth texture, dryness and stiffness for the frozen product irrespective of the type of product. A further singular characteristic of these emulsifiers is that they are concomitantly capable of imparting excellent whippability characteristics to the frozen mix, again irrespective of the type.

DESCRIPTION OF THE PREFERRED EMBODIMENTS

As indicated above, the base materials for obtaining the ethoxylated products useful in the practice of this invention include the partial glycerol esters of a higher fatty acid. Such partial esters are generally referred to as monoglyceride products although more specifically, they are composed of mixtures of monoglycerides and diglycerides further containing very minor amounts of triglyceride and glycerine. These partial esters are mainly characterized in terms of their monoglyceride content. Accordingly, all such monoglyceride products containing at least 10 percent total monoglyceride content (alpha and beta) are applicable in deriving the emulsifiers of this invention. The preferred monoglyceride products are those having from about 20 – 40 wt. percent total monoglyceride content. The applicable monoglyceride products can be readily prepared by the glycerolysis of a triglyceride, i.e., transesterifying a mixture of glycerine and triglyceride in the presence of a basic catalyst, preferably an alkali metal hydroxide. Alternatively, the monoglyceride products can be prepared by directly esterifying glycerine with the fatty acid or acids.

Base monoglyceride products having a higher level of monoglyceride content than that which can be realized in the aforementioned processes can optionally be employed in preparing the condensates contemplated herein. Products of this type are generally obtained by distilling the glycerolysis or esterification products noted above. In view, however, of the marginally improved performance of the emulsifiers derived from distilled products containing in excess of about 70 percent total monoglycerides, the use of such high content monoglyceride products is not economically justified.

The fatty acyl portion of the above-described monoglyceride products can be derived from a fatty acid or a mixture thereof containing from 10 – 24 and more preferably from 14 – 18 carbon atoms. Such fatty acids can be saturated or unsaturated but are preferably saturated. Hydrogenated tallow fatty acids represent the preferred fatty acids for preparing the condensates or adducts contemplated herein.

The ethylene oxides or, more strictly speaking, the polyoxyethylene content of the condensates useful herein can vary widely from about 10 – 95 percent on a weight basis. A more preferred content thereof is from 25 – 80 percent with a range of from about 45 – 75 percent representing the optimum level especially when the condensate is derived from the preferred monoglyceride products.

The condensation of the monoglyceride product with the ethylene oxide can be accomplished under reaction conditions heretofore practiced in carrying out the adduction reaction. Thus, ethylene oxide and the monoglyceride product can be condensed by heating these reactants together in the presence of a suitable catalyst, e.g., an alkali metal hydroxide, at a temperature of from about 300°– 350°F. at pressures of from 20 – 150 psig.

In order to acquaint those skilled in the art as to the best mode contemplated for carrying out the present invention, the following examples are set forth. These examples are primarily given by way of illustration and accordingly, any details expressed therein are not to be construed as limiting the scope of the invention. The only limitations intended are those expressed in the appended claims. All parts are parts by weight unless otherwise indicated.

EXAMPLE I

This example illustrates the use of an ethoxylated monoglyceride in accordance with this invention as an emulsifier in preparing a non-dairy based frozen confection. The same ethoxylated monoglyceride is also employed herein as a blend with a conventional monoglyceride product to show further that the functionality of the ethyoxylate type emulsifier can be enhanced, if desired, by using it in this manner.

The ethoxylated monoglyceride used in this example as well as the succeeding examples, and hereinafter referred to as EO-MG, was prepared by transesterifying 90 parts of hydrogenated tallow with 10 parts of glycerine using 0.3 part of potassium hydroxide as the catalyst. Thereafter, the monoglyceride product in the amount of 535 parts was reacted with 880 parts of ethylene oxide using potassium hydroxide as the catalyst. Further details with respect to the preparation of the monoglyceride and the ethoxylation thereof including the purification workup of the resultant ethoxylate can be found in Example I of U.S. Pat. No. 3,490,918. The monoglyceride (hereinafter referred to as MG) employed to prepare the blend of ethoxylate where shown in the following examples is a commercially available monoglyceride derived from hydrogenated tallow assaying a 52 – 56 percent α-mono content.

The formula for the confection mix of the example follows:

|  | Percent |
|---|---|
| Kaola (hydrogenated vegetable oil) | 4.00 |
| Low heat nonfat dry milk | 12.00 |
| Sucrose | 12.00 |
| Corn syrup solids (42 Dex. equiv.) | 7.00 |
| Regal 12 E. T. Stabilizer (Vegetable gums, edible salts, carrageenan) | 0.35 |
| Emulsifier(s) | 0.05– 0.30 |
| Water | 64.35–64.60 |
|  | 100.00 |

The procedure observed in preparing the frozen dessert composition noted above was as follows:

1. Prepare a dry mix by blending the NFDM, sucrose, corn syrup solids and stabilizer
2. Weigh the water and heat to 100°F.
3. Add the dry mix to the water at 100°F. with vigorous agitation
4. Slowly heat the mix to 130°F, and add the vegetable fat and emulsifier(s)
5. With continued agitation heat the liquid mix to 160°F. and hold for 30 minutes
6. Homogenize the liquid mix at 2,500/500 psi in a two-stage homogenizer
7. Cool rapidly to 40°F. with the aid of a surface cooler and after aging at refrigerator temperatures,
8. Five quarts of mix is dispensed into an ice cream freezer and processed to 23°F. and 100 percent overrun.

A series of batches were prepared according to the foregoing procedure in which the emulsifying agent was varied in composition and/or amount. Details of such variations together with the results obtained for the respective batches are outlined in the following Table I.

Table I

| Batch No. | 1 | 2 | 3 | 4 | 5 | 6 | 7 |
|---|---|---|---|---|---|---|---|
| Emulsifier(s) | MG + EO-MG | MG + EO-MG | MG + EO-MG | EO-MG | EO-MG | EO-MG | EO-MG |
| Emulsifier Ratio | 80/20 | 80/20 | 80/20 | 100/0 | 100/0 | 100/0 | 100/0 |
| Emulsifier Level (%) | 0.1 | 0.2 | 0.3 | 0.05 | 0.10 | 0.20 | 0.30 |
| Time* | 12.0 | 11.5 | 10.75 | 18.0 | 13.0 | 11.5 | 10.5 |
| Appearance** | Slightly Fair Wet Weak | Fair Dry Stiff | Slightly Dry Stiff | Fair Wet Weak | Fair Dry Stiff | Fair Dry Stiff | Dry Stiff |

*Minutes required to achieve 100% overrun
**Appearance at 100% overrun and 23°F.

EXAMPLE II

This example illustrates the preparation of non-dairy frozen confections containing 12% vegetable fat and having the following formula:

|  | Percent |
|---|---|
| Kaola (hydrogenated vegetable oil) | 12.00 |
| Low heat nonfat dry milk | 11.00 |
| Sucrose | 15.00 |
| Regal 12 E. T. Stabilizer | 0.30 |
| Emulsifier(s) | 0.05– 0.30 |
| Water | 61.40–61.65 |
|  | 100.00 |

The identical processing procedure of Example I was observed in the various runs of this example. Likewise, the same emulsifiers were utilized. The results obtained are outlined in the following Table II.

Table II

| Batch No. | 1 | 2 | 3 | 4 | 5 | 6 | 7 |
|---|---|---|---|---|---|---|---|
| Emulsifier(s) | MG + EO-MG | MG + EO-MG | MG + EO-MG | EO-MG | EO-MG | EO-MG | EO-MG |
| Emulsifier | 80/20 | 80/20 | 80/20 | 100/0 | 100/0 | 100/0 | 100/0 |

Table II—Continued

| Batch No. | 1 | 2 | 3 | 4 | 5 | 6 | 7 |
|---|---|---|---|---|---|---|---|
| Ratio Emulsifier Level (%) | 0.1 | 0.2 | 0.3 | 0.05 | 0.10 | 0.20 | 0.30 |
| % Overrun* | 63 | 87 | 100 | 65 | 100 | 100 | 100 |
| Appearance** | Fair | Fair | Fair | Fair | Fair | Churned Fair | |
| | Dry Stiff | Dry Stiff | Dry Stiff | Dry Stiff | Dry Stiff | Dry Stiff | |

*% Overrun achieved after 30 minutes of freezing
**Appearance at 23°F. and indicated extent of overrun

EXAMPLE III

Following the procedure of the previous examples, a series of runs was conducted based on an ice milk formula as follows:

| | Percent |
|---|---|
| Cream (36% milk fat content) | 11.00 |
| Low heat nonfat dry milk | 11.40 |
| Sucrose | 12.00 |
| 43 D. E. corn syrup solids | 7.00 |
| Regal 12 E. T. Stabilizer | 0.35 |
| Emulsifier(s) | 0.05– 0.30 |
| Water | 58.20–57.95 |
| | 100.00 |

The results obtained are outlined in the following Table III wherein the emulsifiers noted are the same as used in the foregoing examples.

EXAMPLE IV

This example illustrates the use of the emulsifier of this invention to prepare ice cream. The formula of the ice cream is as follows:

| | Percent |
|---|---|
| Cream (36% milk fat content) | 33.50 |
| Low heat nonfat dry milk | 9.00 |
| Sucrose | 15.00 |
| Regal 12 E. T. Stabilizer | 0.30 |
| Emulsifier(s) | 0.05– 0.30 |
| Water | 41.90–42.15 |
| | 100.00 |

Following the procedure of the previous examples, a series of runs was made wherein the emulsifiers tested were the same as previously noted. The results of such runs are given in the following Table IV.

Table III

| Batch No. | 1 | 2 | 3 | 4 | 5 | 6 | 7 |
|---|---|---|---|---|---|---|---|
| Emulsifier(s) | MG + EO-MG | MG + EO-MG | MG + EO-MG | EO-MG | EO-MG | EO-MG | EO-MG |
| Emulsifier Ratio | 80/20 | 80/20 | 80/20 | 100/0 | 100/0 | 100/0 | 100/0 |
| Emulsifier Level (%) | 0.1 | 0.2 | 0.3 | 0.05 | 0.10 | 0.20 | 0.30 |
| Time* | 13.25 | 12.5 | 11.0 | 16.25 | 14.00 | 10.25 | 8.00 |
| Appearance** | Wet Fair Weak | Fair Dry Stiff | Slight Dry Stiff | Fair Wet Weak | Fair Dry Stiff | Fair Dry Stiff | Dry Stiff |

*Minutes required to achieve 100% overrun
**Appearance at 100% and 23°F.

Table IV

| Batch No. | 1 | 2 | 3 | 4 | 5 | 6 | 7 |
|---|---|---|---|---|---|---|---|
| Emulsifier(s) | MG + EO-MG | MG + EO-MG | MG + EO-MG | EO-MG | EO-MG | EO-MG | EO-MG |
| Emulsifier Ratio | 80/20 | 80/20 | 80/20 | 100/0 | 100/0 | 100/0 | 100/0 |
| Emulsifier Level(%) | 0.1 | 0.2 | 0.3 | 0.05 | 0.10 | 0.20 | 0.30 |
| Time* | 17.0 | 16.0 | 15.0 | 18.5 | 17.0 | 13.5 | 10.0 |
| Appearance** | Sl. Wet Weak | Fair Dry Stiff | Fair Dry Stiff | Fair Dry Stiff | Fair Dry Stiff | Fair Dry Stiff | Dry Stiff |

* Minutes required to achieve 100% overrun
** Appearance at 100% overrun and 23°F.

What is claimed is:

1. In a method for preparing frozen confections; the improvement of incorporating into a confection mix prior to freezing the mix from about 0.05–0.3 weight percent of a condensation product of from 10 – 95 parts by weight ethylene oxide and corresponding from 90 – 5 parts by weight of a partial glycerol ester of a $C_{10} - C_{24}$ fatty acid containing at lesat 10 wt. percent monoglyceride content with diglycerides, triglycerides and glycerine constituting the balance, as the emulsifier.

2. The improvement in accordance with claim 1 wherein said condensation product is an adduct of from about 25 – 80 parts by weight ethylene oxide and correspondingly from 75 – 20 parts of a partial glycerol ester having a monoglyceride content of from 10 – 70 wt. percent.

3. The improvement in accordance with claim 2 wherein said condensation product is an adduct of from about 45 – 75 parts by weight ethylene oxide and correspondingly from 55 – 25 parts of a partial glycerol ester having a monoglyceride content of from about 20 – 40 wt. percent.

4. The improvement in accordance with claim 3 wherein said fatty acid is a $C_{14} - C_{18}$ saturated fatty acid.

5. The improvement in accordance with claim 4 wherein the partial glycerol ester is a glycerolysis product of hydrogenated tallow.

6. The improvement in accordance with claim 5 wherein said glycerolysis product contains about 30 wt. percent monoglyceride content.

* * * * *